Figure 1:
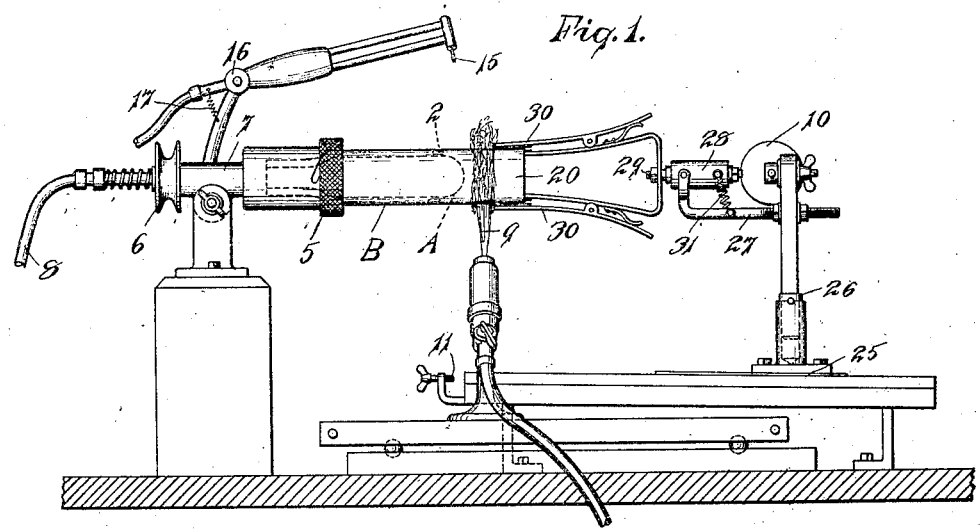

O. MOBERG & E. HOOGE.
APPARATUS FOR THE MANUFACTURE OF DOUBLE WALLED VACUUM RECEPTACLES.
APPLICATION FILED AUG. 12, 1914.

1,199,482.

Patented Sept. 26, 1916.
2 SHEETS—SHEET 1.

WITNESSES:

INVENTORS:
Oscar Moberg:
Edward Hooge:

BY

THEIR ATTORNEY.

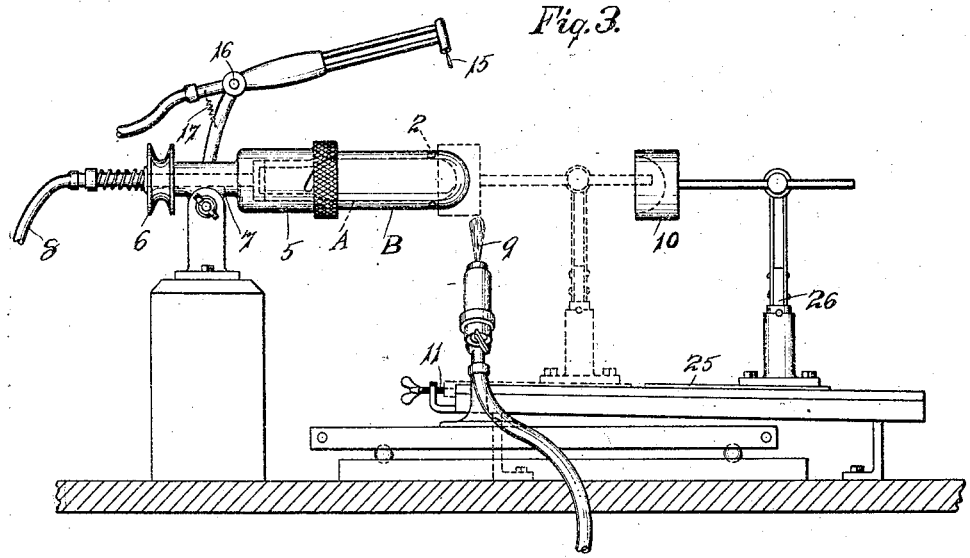
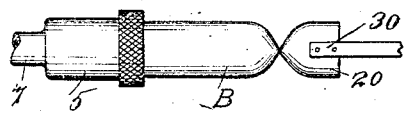
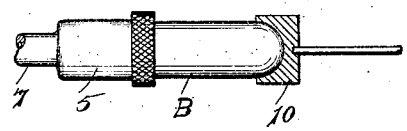
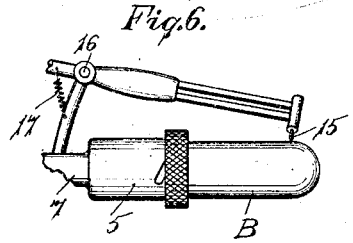

ically used
UNITED STATES PATENT OFFICE.

OSCAR MOBERG AND EDWARD HOOGE, OF NEW BRITAIN, CONNECTICUT, ASSIGNORS TO LANDERS, FRARY & CLARK, OF NEW BRITAIN, CONNECTICUT, A CORPORATION OF CONNECTICUT.

APPARATUS FOR THE MANUFACTURE OF DOUBLE-WALLED VACUUM-RECEPTACLES.

1,199,482. Specification of Letters Patent. Patented Sept. 26, 1916.

Application filed August 12, 1914. Serial No. 856,383.

*To all whom it may concern:*

Be it known that we, OSCAR MOBERG and EDWARD HOOGE, citizens of the United States, and residents of New Britain, in the county of Hartford and State of Connecticut, have invented certain new and useful Improvements in Apparatus for the Manufacture of Double-Walled Vacuum-Receptacles, of which the following is a specification.

This invention relates particularly to the manufacture of vacuum bottles or similar receptacles, and particularly to certain operations in the process of manufacture which take place after the two blanks are assembled together.

The invention relates both to the methods employed and to the apparatus used, the object of the invention being to simplify the operations and reduce the cost of manufacture and at the same time produce a uniform product of high quality.

In the drawings there is illustrated the novel apparatus by which the new method of manufacture hereinafter to be described may be carried out to very good advantage.

Figure 2:
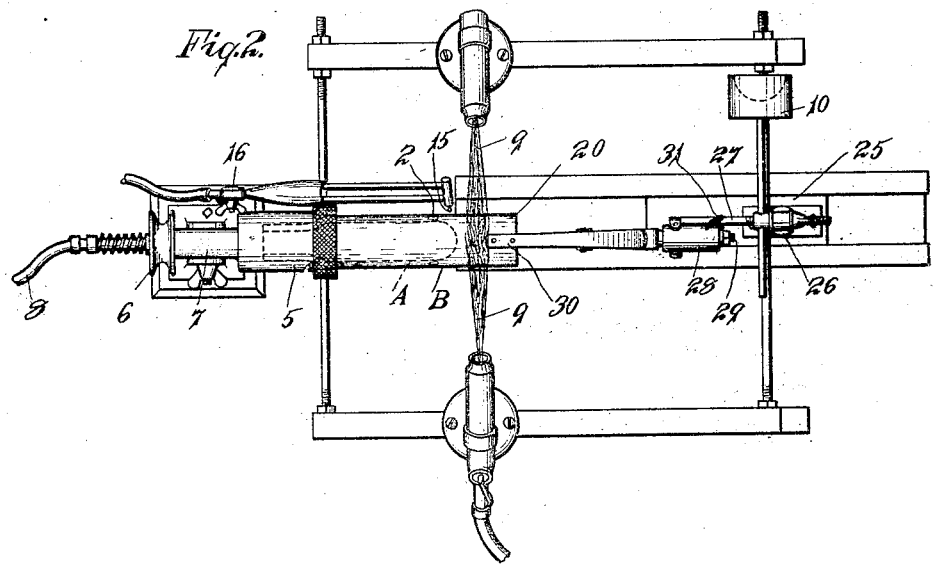

Figure 1 is a side view of the apparatus. Fig. 2 is a top view thereof. Fig. 3 is a view similar to Fig. 1 but showing the bottom mold. Fig. 4 is a detail view showing a step in the operation of closing in the bottom of the outer member when it is of what will be termed the "skirted" type. Fig. 5 is a detail view showing the use of the bottom mold. Fig. 6 is a detail view showing the use of the localized flame for forming the aperture to which the exhausting tube is secured.

Vacuum receptacles, such as the well known vacuum bottles, are formed of inner and outer bottles sealed together at the neck, with the air between the walls exhausted to a greater or less extent so as to provide what is usually termed a vacuum insulation. In the course of manufacture the inner bottle or blank A is formed up to shape, and the outer blank B has its neck portion properly shaped to conform to the neck portion of the inner blank, but its lower end is left open in order that the inner blank may be assembled within it, where it is held by supports 2 in suitable spaced relation. These supports by which the two blanks are supported, one from and by the other, are the same supports which are customarily used between the walls of a vacuum bottle near the bottom to prevent vibration which would cause a cracking at the lip where the two bottles are joined together. By utilizing these supports as holders for the blanks during the process of manufacture, it has been possible to close in, shape and finish the bottom of the outer blank before the two blanks are joined together at the lip, and in consequence it is possible to introduce air pressure within the outer bottle to more accurately form and shape its bottom, and also to produce the small hole to which the exhausting tube is attached. It has also been possible to eliminate special holding and centering devices, formed as a part of the machine or apparatus, and which it has heretofore been customary to use to properly position the inner blank within the outer one. These details in manufacture will be more fully described hereinafter.

It is the utilization of means permanently located between the walls of the blanks, as for instance the ordinary spacing supports, to support one of the blanks from and by the other, which constitutes an important feature of this invention.

Having the two blanks assembled together and supported in proper spaced relation with respect to one another, the next step in the process is the closing in of the bottom of the outer blank. This step in the process is best carried on while the blank is rotating, and for this purpose a chuck 5 is provided into which the outer blank is secured, the chuck being provided with proper driving apparatus as the pulley 6, fast on the chuck shaft which is supported in the bearing 7. The chuck shaft is made hollow and communicates with the interior of the chuck in order that air supplied in any way, as for instance by a blow pipe connected to the tube 8, may be supplied to the interior of the outer bottle. The blanks being supported in and rotated by the chuck, heat is applied to the end of the outer blank, as by the gas flames 9, 9, and the glass heated until it becomes soft enough to be drawn out to roughly close in the bottom. This leaves the bottle very rough and uneven, but by the application of heat and of a slight air pressure within the bottle, while it is being rotated by the chuck, the bottom can be finished with a suitable degree of accuracy both as regards its shape and its spacing from the bottom of the inner blank. In order to produce a uniform product it is advisable as a final operation of this step, to slide up against the finished end a properly shape mold 10 mounted on a slide 25, which comes up against the stop 11, properly positioning the mold with respect to the bottom of the inner blank. This mold is preferably of carbon, and finally shapes the bottom of the outer blank and spaces it accurately with respect to the bottom of the inner blank; while the bottom of the outer blank is rotating in this mold, a slight air pressure within the blank will insure an even and finished product. The mold can be slid back out of the way when it is no longer needed. The bottom of the outer blank now being completed, it is necessary to form a hole in the outer blank and preferably near the bottom, to which the exhausting tube may be attached. This hole is formed by localizing the heat at the proper point, as by the small gas jet 15, and when the glass has been heated to a sufficient extent, the production of a slight air pressure within the blank will break the softened glass away, leaving a small aperture to which one end of a short exhausting tube may be attached. By preference this small jet 15 is supported by an arm which is pivoted as at 16, and the jet is normally held in raised position by the spring 17, but in such relation to the blank as it is held in the chuck that when it is pressed toward the blank the jet will play upon the blank at about the right spot. The two blanks are now completed and ready to be sealed together at the lip, a part of the process of manufacture with which the present invention is not concerned.

In some cases, after the two blanks have been assembled together, the bottom of the outer blank is heated and drawn down roughly to shape but not necessarily closed in, in which case it is only necessary, after the blanks have been placed in the chuck shown in the drawings, to heat the glass, close in the bottom and break off the waste material, after which the process of shaping and completing the outer bottle can be proceeded with in the manner hereinabove described. In other cases, after the two blanks have been assembled together, the outer blank is left in the form in which it was originally made, with what we have termed the "skirt" 20. When the outer blank is of this character, as shown in Figs. 1, 2 and 3, the first step in the process of finishing the bottom is to close in the blank and take away the waste material. In order to do this, the following described instrumentalities are used: The slide 25 carries a rotatable spindle 26 which is the equivalent of a turret head, and to this spindle is secured the mold 10, and arranged at right angles thereto a bracket arm 27, upon which is supported a bearing 28 in such manner that it can freely move to a slight extent in any direction. This bearing 28 carries a shaft 29 upon which are mounted the clips 30 which grip the edge of the skirt as in Fig. 1. A spring 31 is connected between the rear end of the bearing and the bracket arm 27. The shaft 29 is substantially in alinement with the axis of the blanks, and as the blanks are rotated by the chuck the clips 30, 30, of course rotate, and they are free to move or gyrate as it were, in order to follow the motion of the end of the outer blank and avoid subjecting it to any strain which would tend to crack or break it. As the blank is rotated, the skirt being held by the clips, it is heated by the flames 9, 9, and as the glass becomes soft the clips 30 will gradually cease their rotation and the slide 25 may be drawn back, with the result that the bottom of the outer blank is closed in as shown in Fig. 4, and the waste material held by the clips is drawn away and severed from the blank. The hereinabove described method of shaping and finishing the bottom of the outer blank is then proceeded with, and when it is desired to use the mold, the spindle 26 is turned until the mold is in proper position, and then the slide is advanced until it brings up against the stop 11.

As will be clearly seen the stop 11 is adjustable. The mold 10 is adjustable on the spindle 26, as is also the bracket arm 27, in order to accommodate the changes or variations in the size of the blanks which are being operated upon. It will of course be apparent that the clips 30 perform no function in supporting the blanks while they are being operated upon, as the entire support is furnished by the chuck. The support for the bearing 28 in the bracket arm 27 is in the nature of a universal joint, and the spring 31 is just strong enough to overbalance the weight of the clips 30, with the result that the blank is subjected to no strain by these parts.

An important feature of the invention resides in the successive relation of the various steps in the process of completing the double-walled structure from the two blanks, namely, the assembly of the blanks, the insertion of supports between the blanks, and the closing of the bottom of the outer blank, which is done before the lips are united, and, what is of particular importance when, as is usual, the neck is contracted, the holding of the inner blank in position solely by the supports.

It is obvious that the apparatus here described is susceptible of various changes and alterations without departing from the scope of the invention as defined by the appended claims.

We claim as our invention:

1. In a machine for closing in, shaping and finishing the bottom of an open-ended outer blank of a double-walled vacuum receptacle, below and spaced from the closed bottom of the inner blank which is positioned therein, a solid-walled chuck provided with a deep recess in its face and a clamping device at its front end to support and hold the neck of the outer blank with its end spaced from the bottom of said recess, means for rotating said chuck, and means for introducing air under pressure within said chuck at the bottom of said recess.

2. In a machine for closing in, shaping and finishing the bottom of an open-ended outer blank of a double-walled vacuum receptacle, below and spaced from the closed bottom of the inner blank which is positioned therein, a solid-walled chuck provided with a deep recess in its face and a clamping device at its front end to support and hold the neck of the outer blank with its end spaced from the bottom of said recess, means for rotating said chuck, means for introducing air under pressure within said chuck at the bottom of said recess, and a mold arranged in axial alinement with said chuck and adapted for movement toward and away from said chuck.

3. In a machine for closing, shaping and finishing the bottom of the outer member of a vacuum receptacle which has positioned within it an inner blank closed at its bottom, a blank-holding chuck to receive and grip the outer blank at its neck, means for rotating said chuck, means for heating the bottom of said outer blank, a slide, a mold carried by said slide and adapted to be slid into and out of operative relation with respect to the end of the blank, an auxiliary burner pivotally supported and adapted to be swung upon its pivot to locally heat the blank at a desired point, means normally holding said burner out of operative position, and means for supplying air under pressure to the interior of said blank.

4. In a machine of the character described, the combination with a rotatable blank-holding chuck, of a slide, a turret head thereon, a pair of clips carried by said turret and adapted to engage an end of a bottle blank, a rotary support for said clips, and carrying means for said support in the nature of a universal joint, mounted on said turret head.

OSCAR MOBERG.
EDWARD HOOGE.

Witnesses:
ARTHUR T. EVANS,
H. A. TRAVER.